(12) United States Patent
Faus et al.

(10) Patent No.: US 8,779,948 B2
(45) Date of Patent: Jul. 15, 2014

(54) SYSTEM AND METHOD FOR SENSING CARGO LOADS AND TRAILER MOVEMENT

(75) Inventors: Juan Faus, San Diego, CA (US); Mark Dominic Parisi, San Diego, CA (US)

(73) Assignee: Omnitracs, LLC, San Diego, CA (US)

( * ) Notice: Subject to any disclaimer, the term of this patent is extended or adjusted under 35 U.S.C. 154(b) by 0 days.

(21) Appl. No.: 13/472,288

(22) Filed: May 15, 2012

(65) Prior Publication Data

US 2012/0223826 A1  Sep. 6, 2012

Related U.S. Application Data

(63) Continuation of application No. 12/021,667, filed on Jan. 29, 2008, now Pat. No. 8,179,286.

(51) Int. Cl.
*G08G 1/123* (2006.01)

(52) U.S. Cl.
USPC .......................... 340/989; 340/438; 340/689

(58) Field of Classification Search
USPC ............ 340/989, 995.17, 438, 689, 991, 994, 340/995.16, 995.25–995.26, 440, 429, 431, 340/665–666
See application file for complete search history.

(56) References Cited

U.S. PATENT DOCUMENTS

| | | | | |
|---|---|---|---|---|
| 3,848,750 | A * | 11/1974 | Hoge | 212/277 |
| 4,750,197 | A | 6/1988 | Denekamp et al. | |
| 5,491,486 | A * | 2/1996 | Welles et al. | 342/357.74 |
| 5,719,771 | A | 2/1998 | Buck et al. | |
| 6,452,487 | B1 | 9/2002 | Krupinski | |
| 6,519,529 | B2 | 2/2003 | Doyle | |
| 6,697,735 | B2 | 2/2004 | Doyle | |
| 6,920,391 | B2 | 7/2005 | Daubert et al. | |
| 7,015,824 | B2 * | 3/2006 | Cleveland et al. | 340/686.1 |
| 7,489,993 | B2 | 2/2009 | Coffee et al. | |
| 7,586,401 | B2 * | 9/2009 | Payne | 340/431 |
| 7,630,886 | B2 | 12/2009 | Zhang et al. | |
| 7,880,767 | B2 | 2/2011 | Chinigo | |
| 8,179,286 | B2 * | 5/2012 | Faus et al. | 340/989 |
| 2003/0040885 | A1 | 2/2003 | Schoess et al. | |
| 2006/0202809 | A1 * | 9/2006 | Lane et al. | 340/438 |
| 2006/0261935 | A1 | 11/2006 | McAden | |
| 2009/0072956 | A1 * | 3/2009 | Kalous | 340/431 |

FOREIGN PATENT DOCUMENTS

| | | | |
|---|---|---|---|
| WO | 9529410 | A1 | 11/1995 |
| WO | 03104834 | A2 | 12/2003 |
| WO | 2007033049 | A2 | 3/2007 |

OTHER PUBLICATIONS

International Search Report and Written Opinion—PCT/US2009/031994, ISA/EPO—Jun. 29, 2011.
Supplementary European Search Report—EP09705409—Search Authority—Munich—Feb. 7, 2013.

\* cited by examiner

*Primary Examiner* — Daniel Previl
(74) *Attorney, Agent, or Firm* — Arent Fox LLP (57) ABSTRACT

The specification and drawing figures describe and illustrate a system for sensing cargo loads and trailer movement that includes a mobile wireless communications system. A mobile computing platform is mounted on a remote vehicle and operatively connectable across the mobile wireless communications system. Sensor data are collected and stored in the mobile wireless communications system and the mobile computing platform, and may be transmitted across the mobile wireless communications system. At least one program is stored either in the mobile wireless communications system or the mobile computing platform, or both, for using the sensor data to determine equipment use, placement, and positioning in relation to a vehicle and sending one or more sensitivity reports to the asset manager.

28 Claims, 7 Drawing Sheets

SYSTEM AND METHOD FOR SENSING CARGO LOADS AND TRAILER MOVEMENT

CROSS-REFERENCE TO RELATED APPLICATION

The present application for patent is a continuation of U.S. application Ser. No. 12/021,667, filed Jan. 29, 2008, currently pending which is incorporated herein by reference in its entirety.

BACKGROUND

1. Field

The system, apparatus and method disclosed, illustrated, and claimed in this document pertain generally to sensing cargo activity in connection with trailers, including load changes, and movement of the trailers. More particularly, the new and useful method and system for sensing cargo loads and trailer movement uses one or more sensors to provide information including, but not limited to, trailer loading activity and trailer movement. In addition, the method and system for sensing cargo loads and trailer movement is capable of sending a notification and/or report of the location, placement, and movement of cargo and a trailer (in this document, a "sensitivity report") either to a remote vehicle operator or to a mobile asset manager that is monitoring sensitivity reports in connection with a vehicle or a fleet of vehicles having one or more trailers.

2. Background

Mobile asset management is a major concern in various transportation industries such as trucking, railroad, rental equipment, and similar industries. In the trucking industry, for example, an asset manager may be required to track the status and location of several tractor and trailer assets in a fleet. An asset manager may want to know, for example, whether a remote tractor and/or trailer is in service, where the vehicles are located, and what is happening to the trailer in connection with a wide range of variable considerations an asset manager wants to monitor, such as determining if cargo is being loaded onto a trailer, or if the tractor and/or a trailer is in motion, problems solved by the method and system for sensing cargo loads and trailer movement disclosed in this document.

To enable an asset manager to monitor the status of a remote vehicle and/or remote trailer, a system for at least two-way communications between one or more customer base stations, such as a vehicle dispatcher or asset manager of a customer, and a remote vehicle and/or remote trailer, is increasingly in demand. To enhance communications, data development, data storage, and receipt and transmissions of information and reports in connection with remote trailer status between an asset manager and a remote vehicle and/or remote trailer, at least one mobile wireless communications system has been developed with several useful features. The mobile wireless communications system allows customers to track and collect vehicle and/or remote trailer data, operator driving data, and transportation network data; allows communications between a vehicle operator and an asset manager; allows optional communications among vehicle operators and selective communication with third parties; allows an asset manager to monitor various problems confronted by vehicle operators in connection with operation of a remote vehicle and/or remote trailer along a transportation network; substantially constantly collects, stores and transmits information and data about a vehicle, including but not limited to whether cargo is being loaded onto or removed from a trailer, and if the remote trailer is in motion.

Thus, demand in the industry now has grown to require new, useful and improved mobile wireless communications features with enhanced capabilities for inter-communication between at least one base station and one or more remote vehicles and/or remote trailers. Efforts to achieve and ensure communications between and among remote vehicles and/or remote trailers, and asset managers, have been enhanced by including in the mobile wireless communications system a position determining system such as a Satellite Positioning System (SPS).

Such a mobile wireless communications system also may be in part terrestrial, and may be used either independently of an SPS system, or in conjunction with an SPS system, such as QUALCOMM Incorporated's T2 Untethered Trailer-TRACS™ Asset Management System, among others. The T2 system, for example, is capable of processing and managing message traffic at least between a customer and a tractor and/or trailer and/or container. The T2 system includes QUALCOMM Incorporated software used by the customer and asset manager to receive and send information over the wireless network, and may perform a range of additional functions via the Internet. In addition, a mobile wireless communications system may also use alternative channels of communications allowing use of conventional laptop computers that may not be wireless in operation.

At least one unmet demand of asset managers is, however, for an automated system capable of alerting an asset manager about cargo placement in relation to a trailer and movement of the trailer during transit across a transportation network, by sending one or more sensitivity reports to an asset manager.

SUMMARY

The apparatus, system, and method disclosed, illustrated, and claimed in this document address the above-stated need by providing a mobile wireless communications system adapted to communicate with at least a remote trailer. A mobile computing platform is mounted on the remote trailer. The mobile wireless communications system and the mobile computing platform are operatively connected. The mobile computing platform is capable of collecting, storing, and transmitting across the mobile wireless communications system a wide range of operator driving data, trailer data, and transportation network data including but not limited to whether equipment is being loaded onto a trailer and if either the equipment or the trailer is in motion.

More specifically, the mobile computing platform is equipped with a terminal. In part because of the motion sensors described below, the terminal is capable of determining if a load has been removed from a trailer, and if the trailer is empty. Such determinations are achieved by equipping the terminal with an ultrasound sensor capable of detecting a load or loads within a trailer. The terminal also is capable of determining if a load from cargo has been placed on or in a trailer, and, if so, measuring the load status caused by the cargo. When desired by an asset manager, such determinations and measurements of cargo may be conducted substantially automatically and continuously because an asset manager may not know when cargo is added and/or removed from the trailer. The terminal of the mobile computing platform also is operatively connected to one or more data processors monitored by the asset manager across the SPS system that is capable of providing location determination by reporting coordinates indicating where the trailer is located, also substantially automatically and continuously. Accordingly, the asset manager can determine if an asset, including a vehicle and/or trailer, has moved from a prior known location.

The terminal of the mobile computing platform includes one or more motion sensors. Data and information collected by the one or more motion sensors is transmitted via the terminal across the mobile wireless communications system to the one or more data processors monitored by the asset manager. Because the data and information collected by the one or more motion sensors is collected substantially automatically and continuously, the asset manager is alerted in substantially real time if and when the load on or in a trailer is introduced and/or removed. However, if the one or more motion sensors do detect no cargo activity in relation to a trailer, the terminal of the mobile computing platform does not make the determinations and measurements of cargo, thus conserving battery life and reducing messaging costs.

The terminal also is capable of determining movement of a trailer when hitched to a tractor. Once again, however, if the one or more motion sensors do not detect trailer movement, the terminal of the mobile computing platform does not make the determinations and measurements of trailer movement, thus also conserving battery life and reducing messaging costs. In addition, because it is not possible to load or unload cargo when a trailer is moving, if the one or more motion sensors of the terminal determines that the trailer is in motion, the terminal of the mobile computing platform does not make the determinations and measurements of cargo load introduction or removal, thus further conserving battery life and reducing messaging costs Because the mobile wireless communications system is capable of storing in memory one or more algorithms, at least one executable program is provided in connection with the method and system for sensing cargo loads and trailer movement that is capable of using the output of the one or more vibration sensors provide data for the sensitivity reports to be sent to the asset manager.

It will become apparent to one skilled in the art that the claimed subject matter as a whole combines to result in a number of unexpected advantages and utilities. The structure and co-operation of structure of the method and system for sensing cargo loads and trailer movement will become apparent to those skilled in the art when read in conjunction with the following description, drawing figures, and appended claims.

The foregoing has outlined broadly the more important features of the invention to better understand the detailed description that follows, and to better understand the contributions to the art. The method and system for sensing cargo loads and trailer movement is not limited in application to the details of construction, and to the arrangements of the components, provided in the following description or drawing figures, but is capable of other embodiments, and of being practiced and carried out in various ways.

The phraseology and terminology employed in this disclosure are for purpose of description, and therefore should not be regarded as limiting. As those skilled in the art will appreciate, the conception on which this disclosure is based readily may be used as a basis for designing other structures, methods, and systems. The claims, therefore, include equivalent constructions. Further, the abstract associated with this disclosure is intended neither to define the system and method for sensing cargo loads and trailer movement, which is measured by the claims, nor intended to limit the scope of the claims.

The novel features of the method and system for sensing cargo loads and trailer movement are best understood from the accompanying drawing, considered in connection with the accompanying description of the drawing, in which similar reference characters refer to similar parts, and in which:

To the extent that the numerical designations in the drawing figures include lower case letters such as "a,b" such designations include multiple references, and the letter "n" in lower case such as "a-n" is intended to express a number of repetitions of the element designated by that numerical reference and subscripts.

DETAILED DESCRIPTION

Definitions

As used in this document, the term "mobile wireless communications system" means a wireless communications system adapted to communicate with a remote trailer and includes at least the QUALCOMM® T2 Untethered Trailer TRACS Asset Management System, but also includes any mobile wireless communications system capable of tracking and/or communicating with a vehicle and/or remote trailer by mobile two-way satellite and/or terrestrial means to enable a customer to monitor several parameters of the remote vehicle, the vehicle operator, and the transportation network.

The term "asset manager" means a user of the system described, illustrated, and claimed in this document, including subscribers to a mobile wireless communications system, and any agent designated by the subscriber, such as an asset manager and a vehicle operator of a tractor hitched to a trailer.

As used in this document, the term "vehicle data" means at least information about a vehicle and/or remote trailer both (i) at commencement of a transit across a transportation network, and (ii) changes in information about a vehicle and/or remote trailer occurring during transit across a transportation network due, for example, to changed loads, movement of the trailer, and/or, in the case of trucks, changed tractors, trailers, or containers. Accordingly, "vehicle data" includes, but is not limited to, receiving, storing, processing, and transmitting one or more reports from a vehicle and/or trailer to an asset manager about cargo use, placement, and positioning in relation to a trailer; vehicle and/or trailer dimensions; vehicle and/or trailer weight; vehicle and/or trailer contents; geographical locations across a transportation network as defined by geographic coordinates; proposed interim and final destinations of the remote vehicle and/or remote trailer within a transportation network; payloads and payload capacity; and operator driving data, among other information. Vehicle and/or trailer data may be inserted into storage and memory of the method and system for sensing cargo loads and trailer movement either automatically as data is acquired by the mobile communications system via sensors, or by data transfer from a mobile wireless communications center, or by data transfer from the trailer to the asset manager's wireless communications system.

The term "vehicle" as used in this document means motorized vehicles including trucks, tractors, trailers, containers, cars, trains, ships, boats, and the like, as well as other assets such as heavy equipment, and similar assets.

The term "remote" as used in this document means that one object, like a vehicle, is removed in space from another systemically interrelated but distant object or objects like a customer's headquarters, or that one object has the capability of acting on, controlling, sending data to, or acquiring data from, such other systemically interrelated but distant object or objects, without necessarily coming into physical contact with one another.

Description

As illustrated in FIGS. 1-8, a method and system for sensing cargo loads and trailer movement is provided that, in its broadest context, includes a mobile wireless communications system adapted to communicate with a remote vehicle and/or remote trailer. A mobile computing platform is mounted on the remote trailer. The mobile wireless communications systems, and the mobile computing platform, are operatively connected. The mobile computing platform is capable of collecting, storing, processing and transmitting across a mobile wireless communications system a wide range of data, including but not limited to whether cargo is being loaded onto or removed from a trailer, and if either the cargo or the trailer is in motion.

Figure 1:
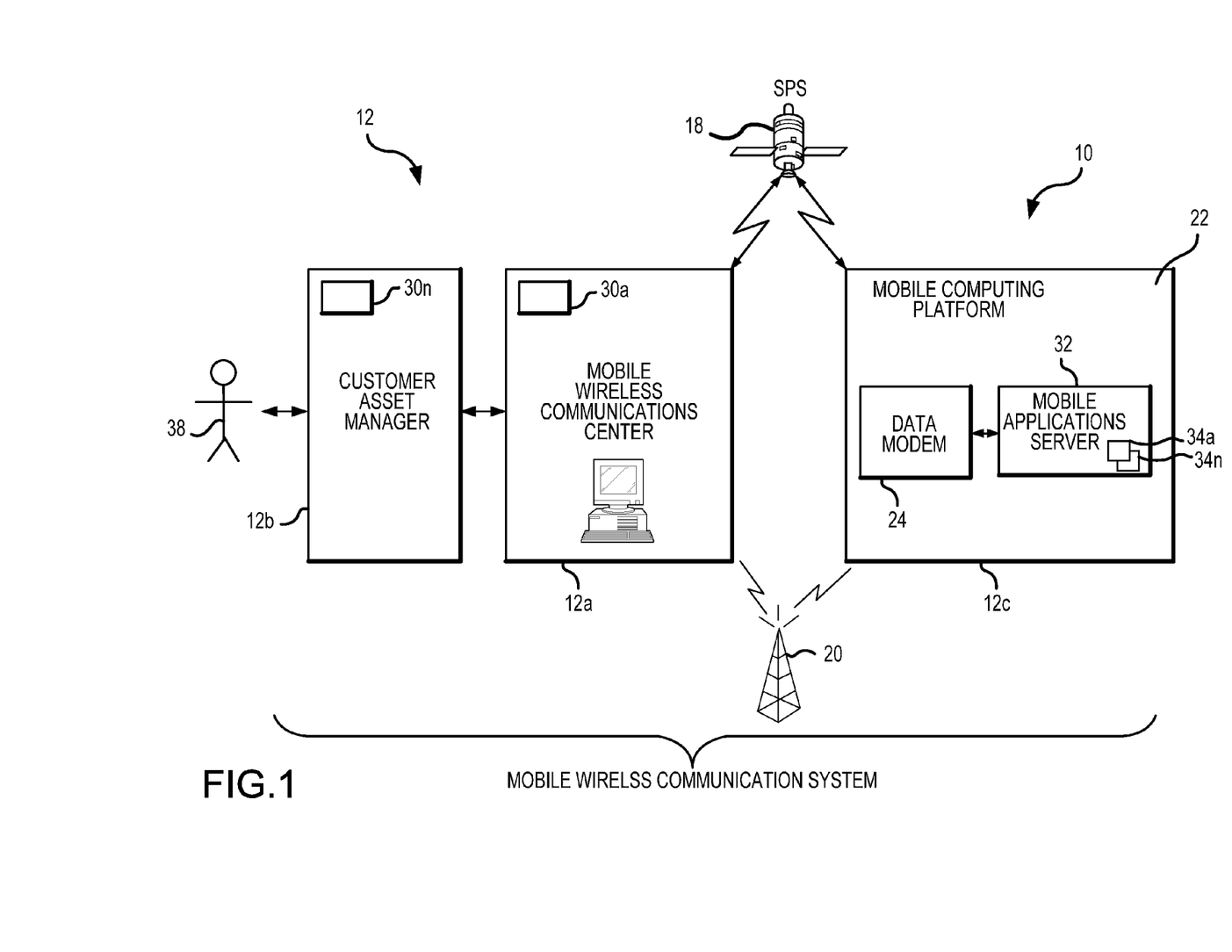
FIG. 1 of the drawing is a block diagram of the components of a mobile wireless communications system in accordance with one aspect of the present invention.
Figure 2:
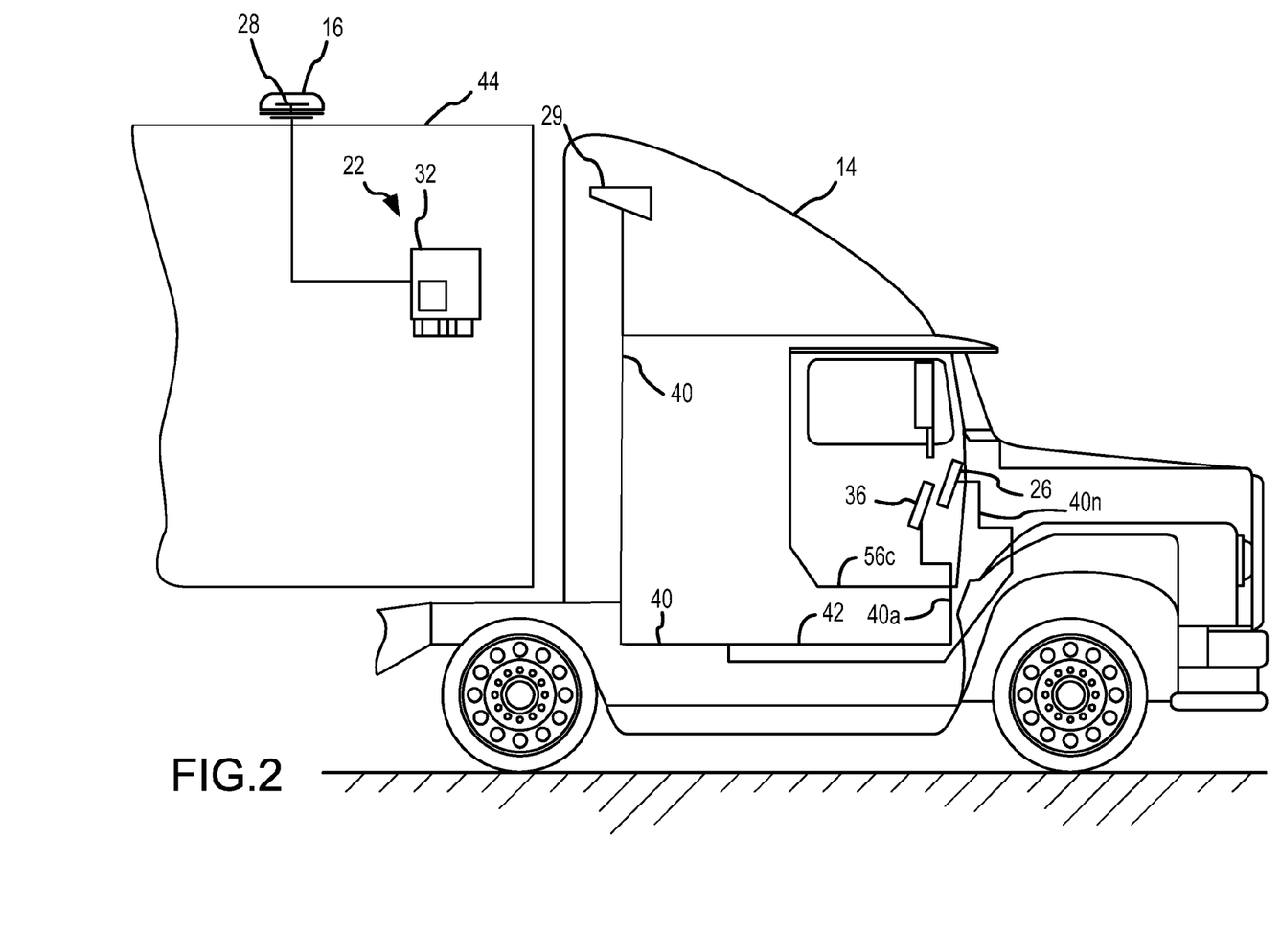
FIG. 2 is a side perspective view of a portion of a trailer attached to a tractor with a mobile computing platform in accordance with an aspect of the present invention.

More specifically, as illustrated by cross-reference between FIGS. 1-2, the method and system for sensing cargo loads and trailer movement 10 includes a mobile wireless communications system 12. The mobile wireless communications system 12 is adapted to communicate with the remote vehicle 14 illustrated in FIG. 2 and, for purposes of the present invention, with trailer 44. The mobile wireless communications system 12 may consist of QUALCOMM Incorporated's T2 Untethered TrailerTRACS™, among others, including QUALCOMM Incorporated's GlobalTRACS™ system. In one aspect of the system and method for sensing cargo loads and trailer movement 10, the mobile wireless communications system 12 also includes a position determination transceiver 16 illustrated in FIG. 2. The position determination transceiver may be part of a Global Positioning System (GPS), a Satellite Positioning System (SPS), or a combination of one or more SPS's and terrestrial systems represented diagrammatically by SPS 18 and 20 in FIG. 1.

As also illustrated in FIGS. 1 and 2, the method and system 60 for sensing cargo loads and trailer movement 10 also includes a mobile computing platform 22. As shown, the mobile computing platform 22 is mounted on the remote trailer 44. As illustrated by cross-reference between FIGS. 1-2, the mobile computing platform 22 mounted on the remote trailer 44 is operatively connectable across the mobile wireless communications system 12. The mobile computing platform 22 is capable of storing in memory a wide variety of data and information, including loading and unloading of cargo to and from trailer 44, and movement of trailer 44 in connection with vehicle 14.

In one aspect of the system and method for sensing cargo loads and trailer movement 10, the mobile computing platform 22 includes, as shown in FIG. 1, a data modem 24, and a mobile applications server 32 mounted on the remote trailer 44. The data modem 24 includes at least one antenna 28, illustrated in FIG. 2, capable of receiving and transmitting messages and signals across an SPS system 18 to a plurality of servers 30a-n and the mobile applications server 32 within the mobile wireless communications system 12 as illustrated diagrammatically in FIG. 1.

The mobile application server 32 is capable of receipt and transmission of communications, including, as illustrated in FIG. 1, communications received through an SPS system 18 relayed to the data modem 24 illustrated in FIG. 2. The mobile application server 32 is not limited to the capability described in this document, but may perform such aspects as processing a signal confirming a host of other features and performances.

As also illustrated in FIG. 1, a substantially terrestrial mobile wireless communications system 20, also capable of processing and managing message traffic at least between a customer asset manager 38 and a trailer/container 44, may also be used for communications across the mobile wireless communications system. As shown, the substantially terrestrial mobile wireless communications system 20 is operatively connected to the mobile computing platform 22 by, for example, a power bus 42 as shown in FIG. 2. The substantially terrestrial mobile wireless communications system 20 is capable of processing not only operator driving data, vehicle data, and transportation network data to a customer in the mobile wireless communications system 12, including an asset manager 38, but also is capable of receiving and displaying information and messages to and from the operator pertaining at least to operator driving data, vehicle data, and transportation network data via the mobile computing platform 22. Accordingly, the mobile wireless communications system 12 and mobile computing platform 22 are capable of collecting, storing, and transmitting operator driving data, vehicle data, and transportation network data.

As will be evident to a person skilled in the art, the mobile computing platform 22 may include one or more programs capable of collecting and collating operator driving data, vehicle data, and transportation network data that may be used in connection with the plurality of general purposes modules 34a-n, the one or more programs associated with the modules, and the combination of data collected from one or more motion sensors 102, described below, included in the mobile computing platform 22 for sending the sensitivity reports to the asset manager 38.

Figure 3:
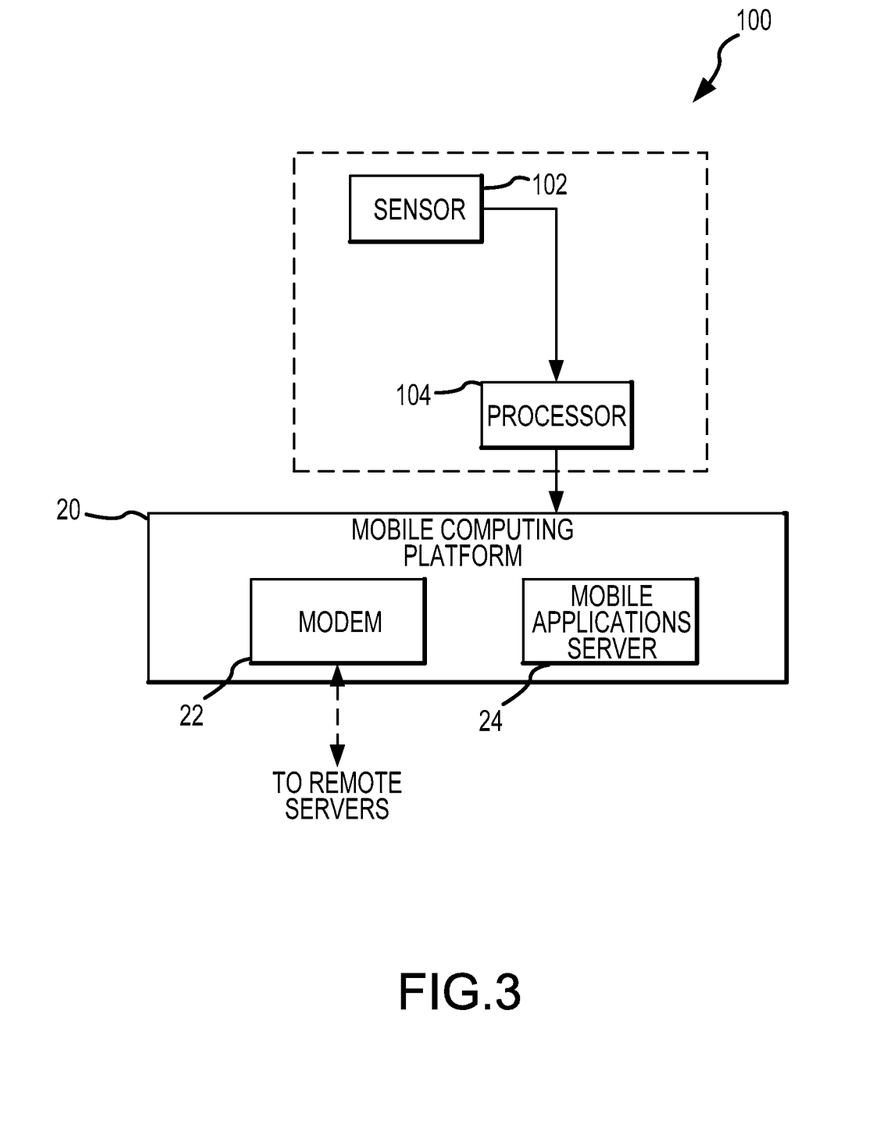
FIG. 3 is a block diagram of a sensor system usable in conjunction with the mobile wireless communications system shown in FIG. 1.

As shown in FIG. 3, the system 10 of a preferred embodiment includes a mobile computing platform 22 mounted on the trailer 44, wherein the mobile computing platform is adapted to communicate with a remote server 30 and to receive and store at least vehicle data. The system 10 of the preferred embodiment further includes a sensor system 100 connected to the mobile computing platform 22. The sensor system 100 can include a sensor 102 disposed in a predetermined location of the trailer 44. The sensor 102 can be adapted to detect vibrations and/or pulses in the predetermined location of the trailer 44, which vibrations and/or pulses can be generally indicative of whether cargo is being loaded in the vehicle, whether the vehicle is in motion, or various other data of interest to the asset manager. The sensor system 100 can also include a processor 104 connected to the sensor 102. The processor 104 can be any suitable type of general-purpose processor as defined herein, and can be adapted to determine a vibration state or a motion state in response to input signals from the sensor 102. The processor 104 can be further adapted to communicate the determined state of the trailer 44 to the mobile computing platform 22, through any conventional communication means. In variations of the system 10 of the preferred embodiment, the processor 104 can be disposed remotely from the mobile computing platform 22, integrated within the mobile computing platform 22, or any other suitable design and/or functionality for receiving input signals from the sensor 102 and communicating said signals to the mobile computing platform 22.

As noted above, the mobile computing platform 22 can be adapted to communicate with the remote server 30*a-n* through one of a satellite communication system or a terrestrial communication system. To that end, the mobile computing platform 22 can include both a mobile application server 32 and a data modem 24.

As noted above, the processor 104 of the sensor system 100 can be adapted to determine a vibration state or a motion state in response to input signals from the sensor 102. In one variation of the system 10 of the preferred embodiment, the vibration state can include a quiet state and a vibrating state, i.e. a state in which the trailer 44 is being loaded with cargo or a state in which there is no detectable movement in the trailer 44. The processor 104 can be adapted to determine a quiet state in response to substantially no pulses detected by the sensor 102 within a predetermined time period. Likewise, the processor 104 can be adapted to determine a vibration state in response to a predetermined number of pulses detected by the sensor 102 within a predetermined time period.

For example, the predetermined time period during which the processor 104 distinguishes between the quiet state and the vibrating state can be between one and five seconds, or as low as approximately one second depending on the type of trailer 44 and the type of data requested. Likewise, the predetermined number of pulses detected by the sensor 102 can range between one and two hundred pulses, depending of course on the duration of the predetermined time period as well as the type of sensor used. For example, if the sensor 102 is a sensitive sensor, such as an SMT sensor, then the predetermined number of pulses might be one hundred fifty pulses over a one-second duration in order to transition to a vibrating state. On the other hand, if the sensor is relatively insensitive, such as a ball sensor, then the processor 104 might recognize a vibrating state in response to one or more pulses being detected in a one second duration.

A transition between the quiet and vibrating states can be useful information to an asset manager. For example, when the processor 104 transitions between the vibrating state and the quiet state, one can reasonably infer that there has been activity within the trailer 44 or a portion of the trailer 44 indicative of a change in the cargo status of the trailer 44. The processor 104 can be further adapted to transition between the quiet and vibrating states only in response to a predetermined level of vibration, such as that level of vibration that would indicate that a forklift is inside a trailer to load or unload the trailer 44. Likewise, the processor 104 can be adapted to filter out smaller vibrations that would indicate non-cargo related activities, such as people walking inside a trailer or movement of the trailer caused by wind or other environmental factors.

In another variation of the system 10 of the preferred embodiment, the motion state can include an in-motion state and a non-in-motion state. The processor 104 can be adapted to determine the in-motion state in response to a vibration rate being greater than an in-motion vibration percentage averaged over a vibration averaging time. As used herein, the vibration rate can be defined as a product of a number of active periods and a vibration active period divided by the vibration averaging time multiplied by one hundred percent. Similarly, the vibration active period can be a function of a vibration sampling period. Thus for example, the vibration sampling period can be less than five seconds, i.e. one second, and the vibration active period can be some multiple of the vibration sample period, i.e. ten seconds.

A vibration active period can be designated an active period by the processor 104 if the number of pulses detected within a vibration sampling period by the sensor 102 meet or exceed a predetermined threshold. The predetermined threshold can be set based upon the type of trailer 44, the vehicle environment, the task for which the vehicle is designed, and/or the type of sensor 102 used in the system 10. For example, if the sensor 102 is an SMT sensor, then the vibration active period can be designated as active if the number of pulses meet or exceed approximately three hundred pulses per one-second vibration sampling period. Alternatively, if the sensor 102 is a ball sensor, then a ten-second vibration active period can be designated as active if the number of pulses meet or exceed approximately four pulses per one-second vibration sampling period.

In another variation of the system 10 of the preferred embodiment, the processor 104 can calculate a vibration rate during a vibration averaging time, which can be configured again based upon type of trailer 44, the vehicle environment, the task for which the vehicle is designed, and/or the type of sensor 102 used in the system 10. For example, if the vibration averaging time is set to one minute, then the vibration rate can be updated each minute by the processor 104 to ensure an updated record of the vibration rate such that the mobile computing platform 22 can readily store, communicate and/or display the current motion state of the trailer 44.

Conversely, the processor 104 can be adapted to determine the not-in-motion state in response to a vibration rate being less than a not-in-motion vibration percentage averaged over a vibration average time. As noted above, the vibration rate can be a product of a number of active periods and a vibration active period divided by the vibration averaging time multiplied by one hundred percent. Similarly, the vibration active period can be a function of a vibration sampling period. Thus for example, the vibration sampling period can be less than five seconds, i.e. one second, and the vibration active period can be some multiple of the vibration sample period, i.e. ten seconds. Also as noted above, the vibration active period can be designated an active period by the processor 104 if the number of pulses detected by the sensor 102 meet or exceed a predetermined threshold, which again can be defined in accordance with type of trailer 44, the vehicle environment, the task for which the vehicle is designed, and/or the type of sensor 102 used in the system 10.

Figure 7:
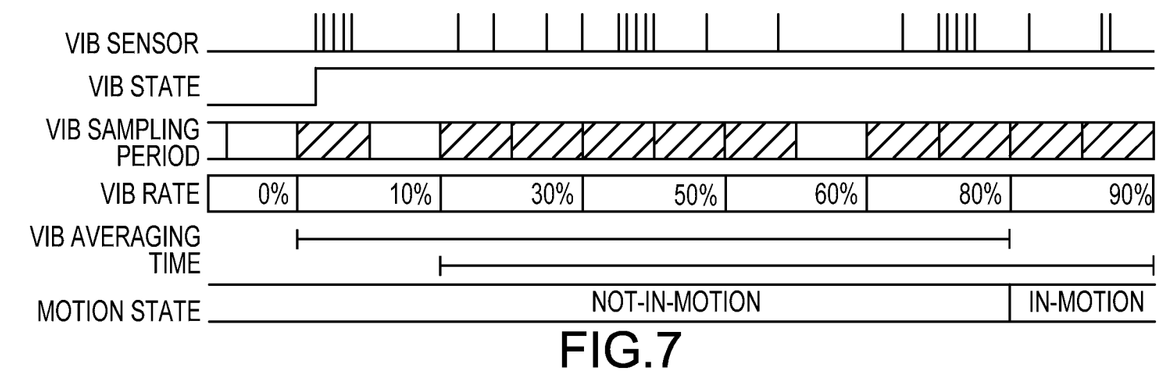
FIG. 7 is a schematic timeline illustrating operation of the system and method of one example embodiment of the present invention.
Figure 8:
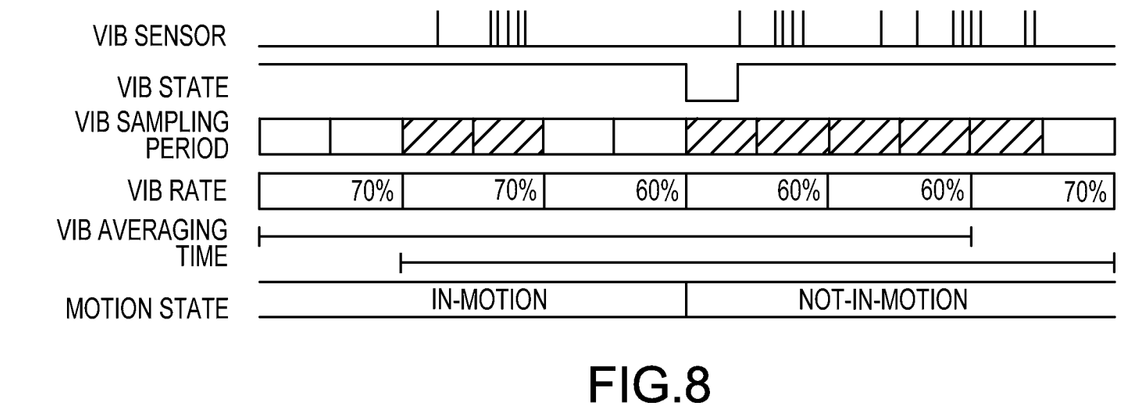
FIG. 8 is a schematic timeline illustrating operation of the system and method of another example embodiment of the present invention.

These variations of the system 10 of the preferred embodiment are illustrated in FIGS. 7 and 8, which are schematic timelines that represent the interaction between the sensor 102 input, the vibration and/or motion states, the vibration sampling period, the vibration rate, and the vibration averaging time. Note that the processor 104 can be adapted to automatically transition from a vibrating state to a quiet state in response to an in-motion state, as it is unlikely that there is any activity in the trailer 44 when it is in motion. For purposes of the example configurations shown in FIGS. 7 and 8, the in-motion vibration percentage is set to seventy-five percent and the not-in-motion percentage is set to sixty-five percent. Similarly, the vibration active period is set to thirty seconds and the vibration averaging time is set to three hundred seconds. As one of skill in the art will recognize, the relevant parameters can be adjusted to tolerate and/or filter out various detected pulses with different thresholds depending on the application in which the system 10 of the preferred embodiment is employed.

As shown in FIGS. 7 and 8, the motion state is recognized as in-motion if the vibration rate is greater than seventy-five percent, and not-in-motion if the vibration rate is less than sixty-five percent. According to this example configuration of the system 10, the motion state will remain in its current and/or previously validated state if the vibration rate is greater than or equal to sixty-five percent and less than or equal to seventy-five percent. Thus, as shown in FIG. 7, the processor 104 determines that the trailer 44 is in a not-in-motion state until the vibration rate exceeds seventy-five percent, at which time the processor 104 transitions into an in-motion state. Likewise, as shown in FIG. 8, the processor 104 determines that the trailer 44 is in an in-motion state until the vibration rate decreases below sixty-five percent, at which time the processor 104 transitions the trailer 44 into a not-in-motion state. As also show in FIG. 8, the processor 104 filters out false not-in-motion states by ensuring that the activity must be so low that it can only signify that the trailer 44 is stopped for a substantial amount of time. Accordingly, if the trailer 44 periodically comes to rest at a stop light, traffic jam or for some other reason, the processor 104 will maintain the in-motion state unless and until the trailer 44 stops for a substantial amount of time.

As noted above, the processor 104 of the sensor system 100 can be communicable with or integrated within the mobile computing platform 22, which in turn is adapted to communicate sensitivity reports to the asset manager. Information received by and/or computed by the processor can be relayed to the mobile computing platform 22, in substantially real-time or in discrete intervals, or in response to a change in the state of the trailer 44 as determined by the processor 104. Information received by the mobile computing platform 22 can be stored in memory, which can include any of the suitable types of long- or short-term types of memory described herein. In addition to the vehicle state, the mobile computing platform 22 can store, receive and transmit information concerning the position of the vehicle to the asset manager such that the asset manager can easily rectify a vehicle's position and its cargo status.

Those of skill in the art will also appreciate that the various illustrative logical blocks, modules, circuits, and algorithm steps described in connection with the aspects disclosed in this document may be implemented as electronic hardware, computer software, or combinations of both. To clearly illustrate this interchangeability of hardware and software, various illustrative components, blocks, modules, circuits, and steps have been described in this document generally in terms of their functionality. Whether such functionality is implemented as hardware or software depends on the particular application and design constraints imposed on an overall system. Skilled artisans may implement the described functionality in varying ways for each particular application, but such implementation decisions should not be interpreted as causing a departure from the scope of the present invention.

Figure 4:
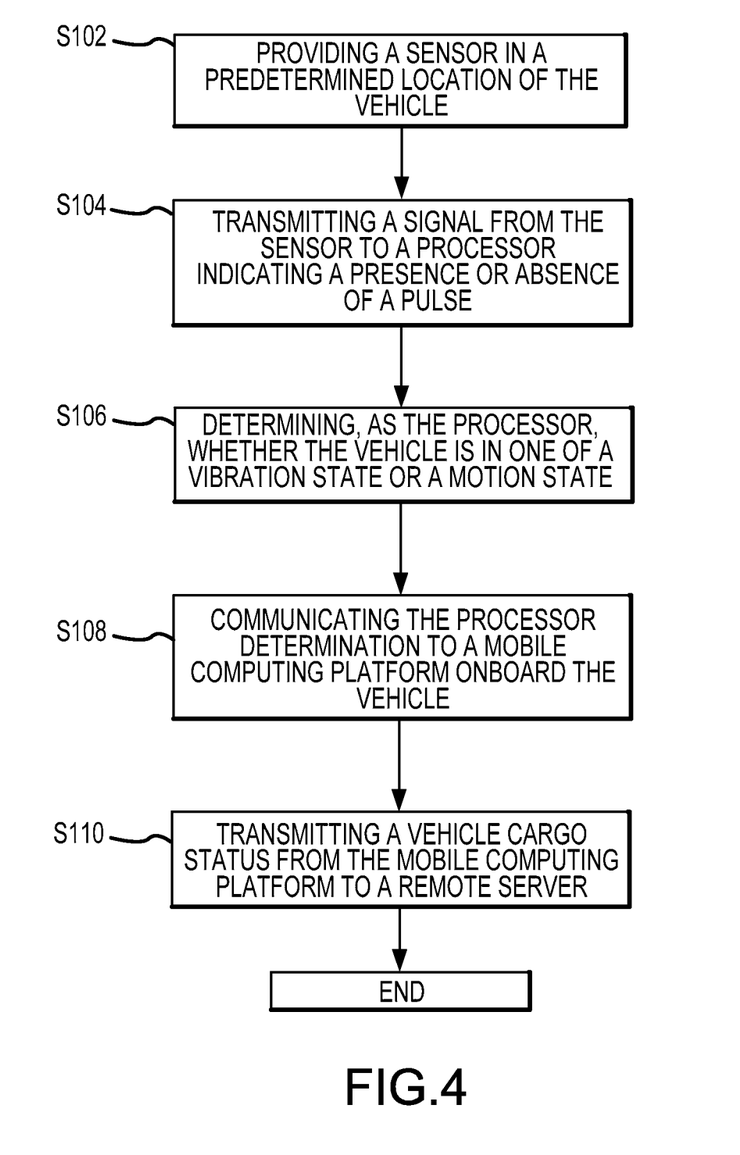
FIG. 4 is a flowchart illustrating a method of sensing cargo loads and trailer movement in accordance with another aspect of the present invention.
Figure 5:
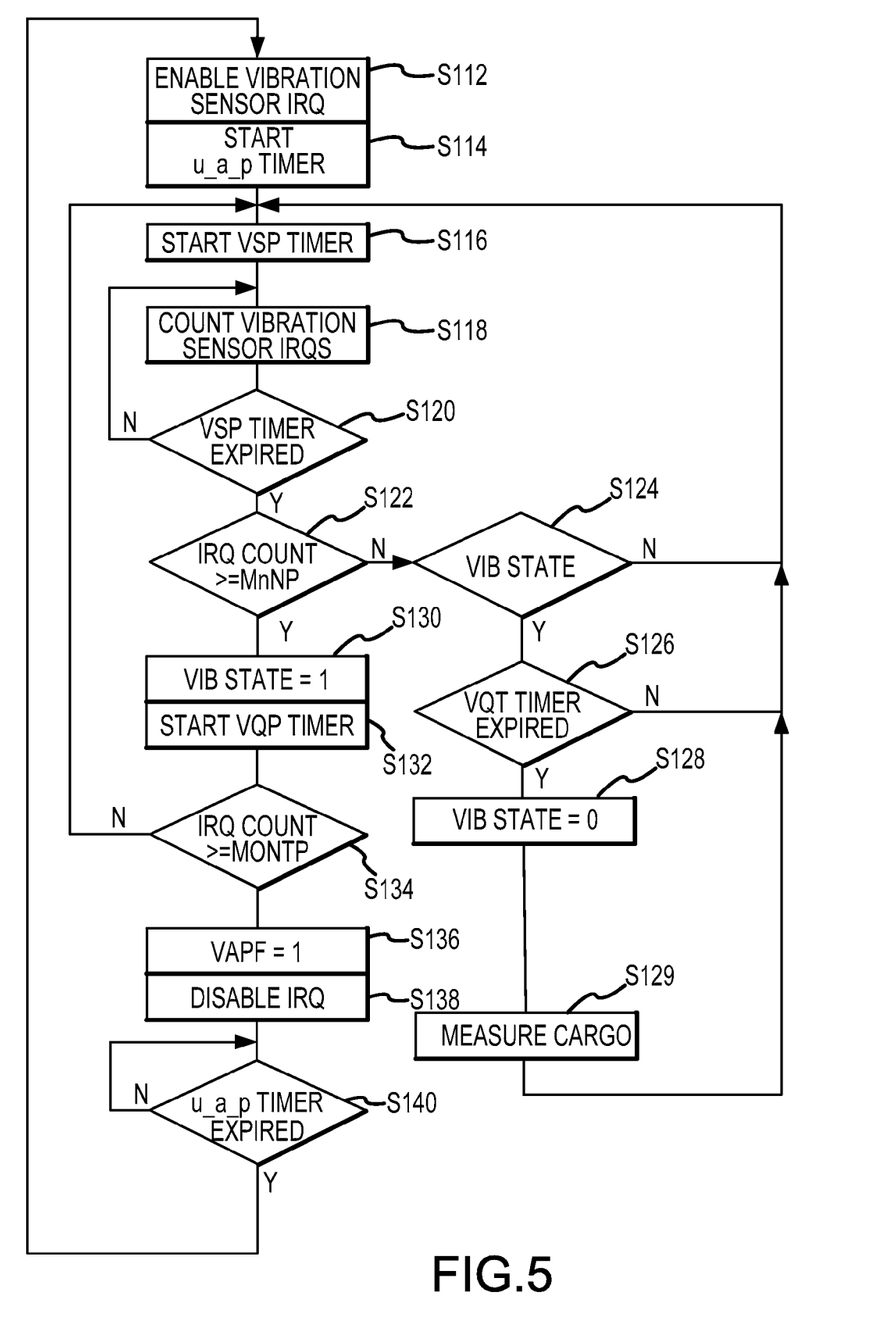
FIG. 5 is a flowchart illustrating a method of sensing cargo loads and trailer movement in accordance with another aspect of the present invention.
Figure 6:
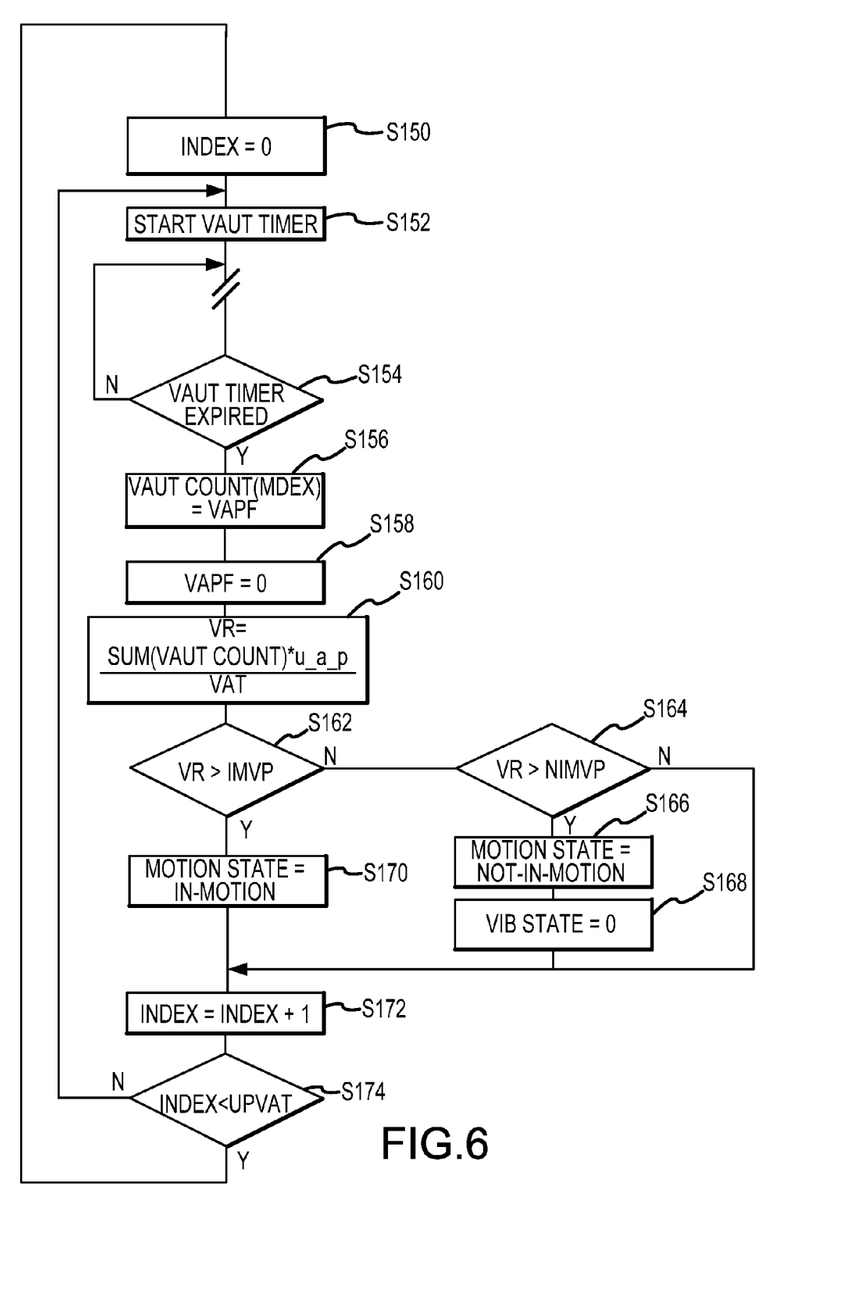
FIG. 6 is a flowchart illustrating a method of sensing cargo loads and trailer movement in accordance with another aspect of the present invention.

For example, FIGS. 4, 5 and 6 are flow chart diagrams illustrating various methods employable by the system 10 of the preferred embodiment, variations thereof, and the several example embodiments described herein. FIG. 4 depicts a method of determining a cargo status of a vehicle in accordance with one preferred embodiment. The method of the preferred embodiment includes step S102, which recites providing a sensor in a predetermined location of the vehicle, the sensor adapted to detect a pulse. As noted above, the predetermined location of the vehicle can be a trailer or other area for which information is sought, including for example whether cargo is being or has been loaded into the vehicle. In step S104, the method of the preferred embodiment recites transmitting a signal from the sensor to a processor indicating a presence of absence of a pulse. The processor can be located in or near the predetermined location of the vehicle, or integrated into a single package with either the sensor or the mobile computing platform. Transmission of the signal from the sensor to the processor can be performed through any convention wired or wireless means and/or networks.

In step S106, the method of the preferred embodiment recites determining, at the processor, whether the vehicle is in one of a vibration state or a motion state, as defined above with reference to the system 10 and the sensor system 100. The processor determination can then be communicated to the mobile computing platform onboard the vehicle in accordance with step S108, and then transmitted as at least a portion of a vehicle cargo status from the mobile computing platform to a remote server in step S110. The steps of transmitting signals, information, determinations and/or vehicle cargo status between any of the sensor, processor, mobile computing platform and/or remote server can be performed in real-time, near real-time, at selected time intervals, at selected position locations and/or in response to any change in the vehicle status as may be determined or configured according to the specific environment in which the methods described herein are practiced.

FIG. 5 is a flowchart illustrating an example method of determining a cargo status of a vehicle in accordance with another aspect of the present invention. In step S112 an interrupt request (IRQ) enables a vibration sensor, such as sensor 102, and in step S114 a vibration activity period (v_a_p) timer is started. The vibration activity period timer functions to periodically reset an activity period to ensure proper weighting of the vibration rate during each state of the vehicle. In step S116, the method recites starting a vibration sampling period (VSP) timer, which functions to subdivide an activity period into increments during which a determination can be made regarding the state of the vehicle. In step S118, the method recites counting vibration sensor IRQs, i.e. a number of signals and/or indications of a vibration event, such as a pulse as described above.

In step S120, if the VSP timer is expired, then the method proceeds to step S122. If the VSP timer is not expired, then step S120 feeds back to step S118 to resume counting of the vibration sensor IRQs. In step S122, if a number of vibration sensor IRQs exceeds a minimum number of pulses (MinNP), then the method proceeds to vibration state one in step S130 and starts a vibration quiet period (VQP) timer. If, on the other hand, the number of vibration sensor IRQs does not exceed MinNP, then the method proceeds to decision block S124. In step S124, the method queries whether the system is in a vibration state. If negative, then the method feeds back to step S116 and starts the VSP timer. If affirmative, then the method proceeds to step S126 which queries whether the VQT timer has expired. If the response to step S126 is affirmative, then the method proceeds to step S128 in which the processor determines that the system in not in a vibration state and proceeds back to step S116. The change from vibration to quiet causes the system to determine if a cargo change has occurred as shown in S129. If the response to step S126 is negative, then the method returns to step S116 and resets the VSP timer.

Step S134 again inquires as to whether an IRQ count exceeds a motion number of pulses (MotNP). If step S134 is negative, then the method fees back to step S116 and starts the VSP timer. If step S134 is affirmative, then the method proceeds to step S136 that sets a vibration active period flag as active for a motion state and further disables the IRQ in step S138. In step S140, the method queries whether the vibration activity period timer is expired. If affirmative, then the method returns to step S112; and if negative, then the method continues on a feedback loop until the affirmative response is attained.

FIG. 6 is a flowchart illustrating another example method of determining a motion status of a trailer 44. In step S150, the method of FIG. 6 starts by setting an index value to zero. In step S152, the method starts a vibration average update time (VAUT) timer and proceeds to step S154, which is a feedback query as to whether the VAUT timer is expired. In response to an affirmative value in step S154, the method proceeds to steps S156, which recites setting a VAUT count equal to the vibration active period flag. In step S158, the vibration active period flag is reset to zero, and in step S160, the vibration rate (VR) is calculated as the product of a summation of the VAUT count and the vibration activity period divided by the vibration averaging time (VAT). In step S162, the method queries whether the VR is greater than an in-motion vibration percentage (IMVP).

If the response is affirmative, then the method proceeds to step S170, and the motion state is set to in-motion. If the response is negative, then the method proceeds to step S164, which queries whether the VR is less than a non-in-motion vibration percentage (NIMVP). If the response is affirmative, then the system is set to a motion state equal to not-in-motion in step S166, the vibration state is set to zero in step S168, and the method proceeds to step S172 in which the index is summed. If the query in step S164 is negative, then the method proceeds directly to step S172 and the index is incremented.

From step S172, the method proceeds to step S174, in which the method queries whether the index value from step S172 is less than an vibration averaging time/vibration average update time (UpVAT) value. If the answer is negative, then the method returns to step S152 and starts the VAUT timer. If the answer is affirmative, then the method returns to step S150 and the index is reset to zero.

The various illustrative logical blocks, modules, and circuits described in connection with the aspects disclosed in this document may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination designed to perform the functions described in this document. A general-purpose processor may be a microprocessor, but in the alternative, the processor may be any conventional processor, controller, microcontroller, or state machine. A processor may also be implemented as a combination of computing devices such as, in a non-exclusive example, a combination of a DSP and a microprocessor, a plurality of microprocessors, one or more microprocessors in conjunction with a DSP core, or any other such configuration.

The one or more algorithms associated with the mobile computing platform 22 illustrated in this document may be embodied directly in hardware, in a software module executed by a processor, or in a combination of the two. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD-ROM, or any other form of storage medium known in the art. An exemplary storage medium is coupled to the processor so the processor may read information from, and writes information to, the storage medium. In the alternative, the storage medium may be integral to the processor. The processor and the storage medium may reside in an ASIC. An ASIC, if used, may reside in the mobile computing platform 22. In the alternative, the processor and the storage medium may reside as discrete components in any component of the mobile computing platform 22.

Any machine-readable medium tangibly embodying instructions may be used in implementing the methodologies described in this document. As a non-exclusive example, software codes may be stored in a memory or database or storage unit, and executed by a processor, for example a microprocessor of the mobile applications server 32. Memory may be implemented within the processor or external to the processor. As used in this document, the term "memory" refers to any type of long term, short term, volatile, nonvolatile, or other memory and is not to be limited to any particular type of memory or number of memories, or type of media upon which memory is stored.

The description of the disclosed aspects is provided to enable any person skilled in the art to make or use the apparatus, system, and method disclosed, illustrated and claimed in this document. Various modifications to these aspects will be readily apparent to those skilled in the art, and the generic principles defined in this document may be applied to other aspects without departing from the spirit or scope of the system for providing individualized training curricula to vehicle operator. Thus, the invention is not intended to be limited to the aspects shown in this document, but is intended to be accorded the widest scope consistent with the principles and novel features disclosed in this document.

The method and apparatus described in this document may be used with various satellite positioning systems (SPS), such as the United States Global Positioning System (GPS), the Russian GLONASS system, the European Galileo system, any system that uses satellites from a combination of satellite systems, or any satellite system developed in the future. Furthermore, the disclosed method and apparatus may be used with positioning determination systems that utilize pseudolites or a combination of satellites and pseudolites. Pseudolites are ground-based transmitters that broadcast a PN code or other ranging code similar to a GPS or CDMA cellular signal, modulated on an L-band or other frequency carrier signal, which may be synchronized with GPS time. Each such transmitter may be assigned a unique PN code to permit identification by a remote receiver. Pseudolites are useful in situations where GPS signals from an orbiting satellite might be unavailable, as in tunnels, mines, buildings, urban canyons or other enclosed areas. Another implementation of pseudolites is known as radio beacons. The term "satellite," as used herein, is intended to include pseudolites, equivalents of pseudolites, and possibly others. The term "SPS signals", as used in this document, is intended to include SPS-like signals from pseudolites or equivalents of pseudolites.

Claim elements and steps in this document have been numbered solely as an aid in understanding the description. The numbering is not intended to, and should not be considered as intending to, indicate the ordering of elements and steps in the claims. In addition, the method and system for sensing cargo loads and trailer movement shown in drawing FIGS. 1-8 shows at least one aspect of the system for providing individualized training curricula to a vehicle operator, not intended to be exclusive, but merely illustrative of the disclosed embodiments. Also, method steps may be interchanged sequentially without departing from the scope of the invention. Means-plus-function clauses in the claims are intended to cover the structures described as performing the recited function that include not only structural equivalents, but also equivalent structures.

What is claimed is:

1. A vibration sensing system comprising:
   a mobile computing platform associated with a cargo container and communicatively coupled to a remote server, wherein the cargo container is configured to carry cargo and to be movable by a vehicle, and the mobile computing platform receives and stores data associated with the cargo container;
   a sensor, disposed in the cargo container, that outputs a vibration signal indicative of vibrations in the cargo container; and
   a processor that receives the vibration signal from the sensor, determines a motion state indicating whether the cargo is being moved relative to the cargo container based on the vibration signal, and communicates the determined motion state of the cargo container to the mobile computing platform.

2. The vibration sensing system as recited in claim 1, wherein the mobile computing platform communicates with the remote server through one of a satellite communication system or a terrestrial communication system.

3. The vibration sensing system as recited in claim 1, wherein the processor determines that the motion state comprises an in-motion state based on a vibration averaging over time.

4. The vibration sensing system as recited in claim 3, wherein a vibration rate is a product of a number of active periods and a vibration active period divided by the vibration averaging time multiplied by one hundred percent.

5. The vibration sensing system as recited in claim 4, wherein a vibration active period is a function of a vibration sampling period.

6. The vibration sensing system as recited in claim 5, wherein the vibration sampling period is less than five seconds.

7. The vibration sensing system as recited in claim 5, wherein the vibration active period is a function of a number of vibration pulses detected by the sensor within a vibration sampling period.

8. The vibration sensing system as recited in claim 1, wherein the sensor determines that the motion state comprises a not-in-motion state in response to a vibration rate being less than a not-in-motion vibration percentage averaged over a vibration average time.

9. The vibration sensing system as recited in claim 8, wherein the vibration rate is a product of a number of active periods and a vibration active period divided by the vibration averaging time multiplied by one hundred percent.

10. The vibration sensing system as recited in claim 9, wherein the vibration active period is a function of a vibration sampling period.

11. The vibration sensing system as recited, in claim 10, wherein the vibration sampling period is less than five seconds.

12. The vibration sensing system as recited in claim 10, wherein the vibration active period is a function of a number of pulses detected by the sensor.

13. The vibration sensing system as recited in claim 1, wherein the mobile computing platform is connected to a position determination transceiver.

14. The vibration sensing system as recited in claim 13, wherein the position determination transceiver is a Global Positioning System (GPS) transceiver or a Satellite Positioning System (SPS) transceiver.

15. The vibration sensing system as recited in claim 1, wherein the mobile computing platform includes memory located in the mobile computing platform for storing vehicle data.

16. The vibration sensing system as recited in claim 1, wherein the motion state comprises identifies cargo activity in relation to movement of the cargo container.

17. The vibration sensing system as recited in claim 1, wherein the sensor detects the vibrations in a predetermined location of the cargo container.

18. The vibration sensing system as recited in claim 1, wherein the processor suspends a determination of the motion state when the processor determines that the cargo container is in motion.

19. The vibration sensing system of claim 1, wherein the motion station comprises a quiet state and a vibrating state corresponding to a predetermined level of vibration, wherein the processor is further configured to determine a transition between that the quiet state and the vibrating state.

20. A vibration sensing apparatus comprising:
    mobile computing means associated with a cargo container for receiving and storing data associated with the cargo container, the mobile computing means being communicatively coupled to a remote server, wherein the cargo container is configured to carry cargo and be movable by a vehicle;
    sensing means, disposed in the cargo container, for outputting a vibration signal indicative of vibrations in the cargo container; and
    processing means for receiving the vibration signal from the sensor, determining a motion state indicating whether the cargo is being moved relative to the cargo container based on the vibration signal, and communicating the determined motion state of the cargo container to the mobile computing means.

21. The vibration sensing apparatus as recited in claim 20, wherein the sensing means detects the vibrations in a predetermined location of the cargo container.

22. The vibration sensing apparatus as recited in claim 20, wherein the processor suspends the determining of the motion state when the processor determines that the cargo container is in motion.

23. A computer program product, comprising:
    a non-transitory computer-readable medium comprising:
        a first set of codes for causing a computer to receive and store data associated with a cargo container, wherein the cargo container is configured to carry cargo and be movable by a vehicle;
        a second set of codes for causing the computer to receive a vibration signal from a sensor disposed in the cargo container;
        a third set of codes for causing a computer to determine a motion state indicating whether the cargo is being moved relative to the cargo container; and based on the vibration signal
        a fourth set of codes for causing the computer to communicate the determined motion state of the cargo container to a mobile computing platform communicatively coupled to a remote server.

24. The computer program product as recited in claim 23, wherein the sensor detects the vibrations in a predetermined location of the cargo container.

25. The computer program product as recited in claim 24, wherein the third set of codes is further configured to suspend a determination of the motion state when the computer determines that the cargo container is in motion.

26. A method of vibration sensing, comprising:
   receiving in a memory and storing data associated with a cargo container, wherein the cargo container is configured to carry cargo and be movable by a vehicle;
   receiving, via a sensor disposed in the cargo container, a vibration signal indicative of vibrations in the cargo container;
   determining, via a processor, a motion state that indicates whether the cargo is being moved relative to the cargo container based on the vibration signal; and
   communicating the determined motion state of the cargo container to a mobile computing platform communicatively coupled to a remote server.

27. The method of claim 26, further comprising detecting the vibrations in a predetermined location of the cargo container.

28. The method of claim 26, further comprising suspending the determining of the motion state when the processor determines that the cargo container is in motion.

\* \* \* \* \*